United States Patent Office 2,834,275
Patented May 13, 1958

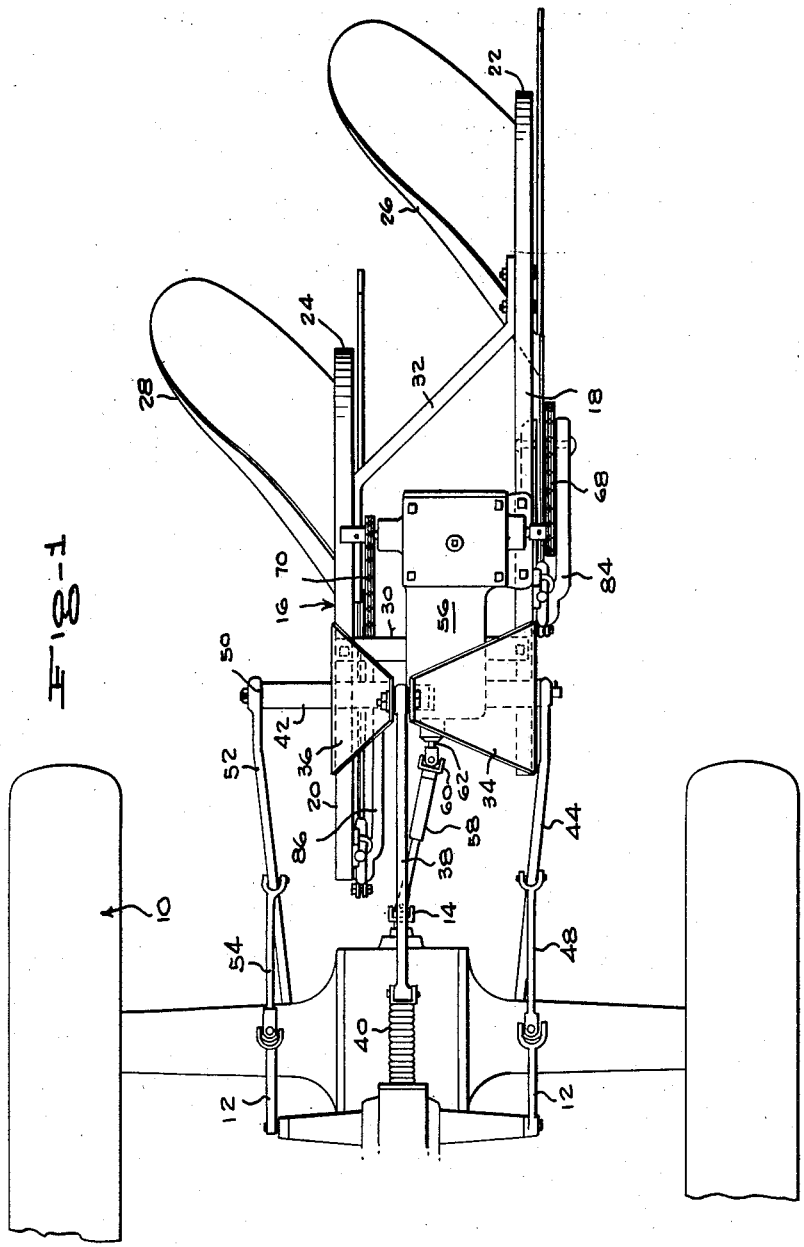

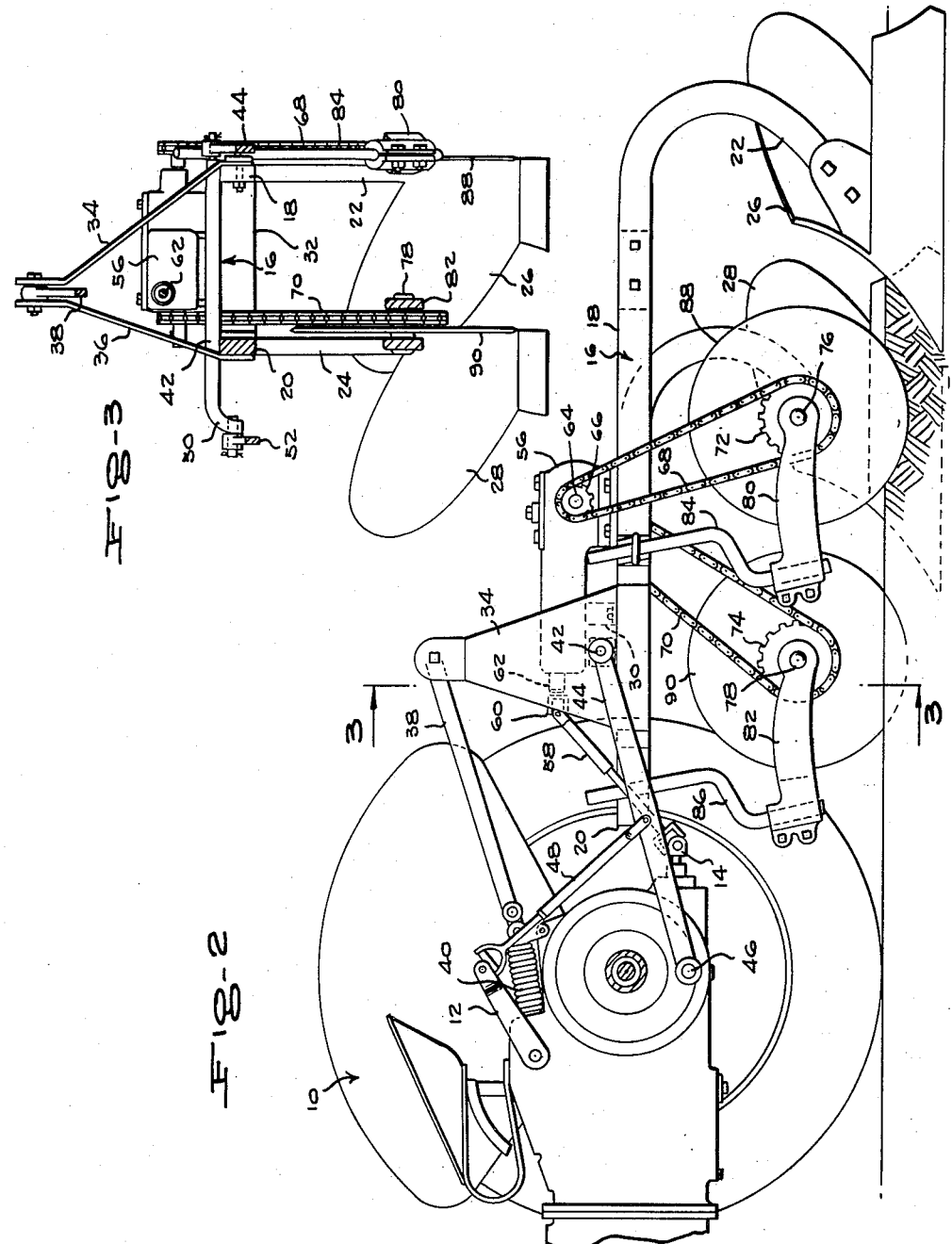

2,834,275
POWER DRIVEN ROLLING CUTTER
Doyle Hines, Carmi, Ill.

Application April 20, 1956, Serial No. 579,649

1 Claim. (Cl. 97—35)

This invention relates to a rolling cutter, adapted to be used in association with a tractor drawn plow, so as to slice heavy vegetation, straw, etc.

A rolling cutter of conventional design often will not turn in ground that is sandy or soft, or is littered to an excessive degree with debris, such as straw left after the combining of wheat. Under such circumstances, the cutter simply slides along the ground, and fails to discharge its intended functions with full efficiency.

The main object of the present invention is to provide a generally improved, power driven cutter, the several discs of which will be driven from the power take-off of the tractor. To this end, the cutter includes a plurality of discs spaced apart transversely of the plow, and also spaced longitudinally of the plow, said discs being linked to the output of a transmission or gear box, the input shaft of which is connected by universal joints and spline shaft means to the power take-off of the associated tractor. The device is adapted to be connected to a conventional three-point hook-up of a tractor, and elevation and lowering of the plow and cutter is adapted to be carried out without affecting the driving connections between the power take-off and the several discs.

An object of importance, in this connection, is to provide an improved device of the nature referred to which is so designed as to facilitate the operation of the rotating cutter discs from the power take-off of the tractor, thus causing the discs to rotate faster than the plow travels. The discs thus have the effect of slicers, as well as the ordinary cutting action resulting from rolling thereof upon the ground. This eliminates choking and clogging of the cutting discs, as distinguished from devices previously conceived for the purpose of cutting the ground in advance of plow bottoms drawn through the ground.

Other objects will appear from the following description, the claim appended thereto, and from the annexed drawings in which like reference characters designate like parts throughout the several views and wherein:

Figure 1 is a top plan view of a plow formed according to the present invention, an associated tractor being illustrated fragmentarily;

Figure 2 is a side elevational view of the cutter and plow structure, the tractor being illustrated fragmentarily and in section; and Figure 3 is a transverse sectional view on line 3—3 of Figure 2.

Referring to the drawings in detail, the reference numeral 10 generally designates a conventional tractor, having the usual hydraulically actuated lift arms 12 and power take-off 14.

The plow and cutter constituting the present invention has been generally designated at 16, and includes a pair of horizontally extending plow beams 18, 20 offset from one another longitudinally of the device as shown in Figure 1 and also spaced apart transversely of the structure, again as shown in Figure 1. The plow beams, at their rear ends, are formed with downwardly and forwardly curving extensions 22, 24, and connected to said extensions are plow bottoms 26, 28 respectively, of conventional design.

Bracing the plow beams in a transverse direction, and providing a fixed connection therebetween, is a cross bar 30 normal to the lengths of the straight portions of the plow beams, said cross bar being fixedly connected at its opposite ends to the respective beams. Disposed rearwardly of the cross bar 30 (see Figure 1) is an obliquely disposed cross bar 32, also connected fixedly between the plow beams.

Fixedly secured at their lower ends to the forward end portions of the beams 18, 20 are upwardly projecting, approximately triangular plates 34, 36 respectively. These converge in an upward direction as shown in Figure 3, with the inclination of plate 34 from the vertical being greater than that of plate 36, so as to offset the upper ends of the plates 34, 36 from the midwidth point of the apparatus. At their upper ends, the plates have upwardly projecting, vertically disposed, spaced ears, having transversely aligned openings receiving a pivotal connection to the rear end of an arm or link 38, the other end of which is connected to the tractor through the medium of a bell crank and spring 40. The arms 38 and the spring 40 constitute parts of a conventional three-point hook-up, also including a cross bar 42 mounted upon the plow beams, one end of the cross bar projecting laterally beyond the plow beam 18 as shown in Figure 1 and being pivotally connected to a link 44 that is pivoted at 46 to the tractor. Link 44 constitutes a second component of a three-point hook-up, and the third point is provided by a link 48 pivotally connected between the link 44 and the lift arm of the tractor.

As shown in Figure 3, the bar 42 at one end has a depending extension, disposed laterally outwardly a substantial distance from the adjacent beam 20, and extending through the extension 50 is a pin on which pivots one end of a link 52 matching link 44 and pivotally connected to the tractor. Pivotally connected to link 52 is a link 54, connected to the other lift arm 12 of the tractor as shown in Figure 1.

There is thus provided a conventional three-point hook-up for the invention, permitting the entire device to be raised or lowered relative to the ground surface.

Mounted upon the structure, between the plow beams, is a gear box 56. A spline shaft 58 is universally connected at one end to power take-off 14, and at its other end has a universal connection 60 to the input shaft 62 of the gear box.

The output of the gear box is transmitted through a horizontal shaft 64 extending transversely of and above the plow beams, and connected to opposite ends of the shaft 64 are drive sprockets 66 about which are trained belts 68, 70 respectively. One belt extends rearwardly, downwardly from its associated sprocket with the other belt extending forwardly, downwardly therefrom as shown in Figure 2.

The belts, at their lower ends, are trained about larger sprockets 72, 74 mounted upon stub shafts 76, 78 carried by arms 80, 82 adjustably connected to the forwardly offset lower ends of hanger bars 84, 86 that are clamped at their upper ends to the respective plow beams 18, 20.

The adjustment of the arms 80, 82 is effected in up-and-down directions, with the portions of the hanger bars on which the arms are mounted being inclined from the vertical as shown in Figure 2. By downward adjustment of the arms, the tension of the chains can be correspondingly adjusted.

The ratio of the speed of rotation of the discs to the speed of the power take-off can, of course, be selected by use of a selected train of gears within the gear box, and is at the option of the manufacturer.

By reason of the particular construction, the cutter discs of the device, which have been designated at 88, 90 and are secured to the sprockets 72, 74 for rotation therewith rotate at high speed, so as to produce a slicing action combined with a rolling cutter action. This prevents choking and clogging of the cutter discs, and has been found to insure the efficient cutting of straw, heavy vegetation, etc., regardless of the type of ground in which the structure is used.

The invention will, it will be understood, work on a trail type plow as well as it does on a three-point hitch plow.

It is believed apparent that the invention is not necessarily confined to the specific use or uses thereof described above since it may be utilized for any purpose to which it may be suited. Nor is the invention to be necessarily limited to the specific construction illustrated and described, since such construction is only intended to be illustrative of the principles, it being considered that the invention comprehends any minor change in construction that may be permitted within the scope of the appended claim.

What is claimed is:

In a rolling cutter attachment for a tractor, the combination, with an elevatable implement hook-up and a power take-off, said hook-up comprising a pair of hydraulically actuated lift arms mounted on said tractor for vertical swinging movement about a horizontal axis extending transversely of the tractor, said power take-off comprising a horizontal shaft extending rearwardly from the tractor below and rearwardly from the lift arms, said hook-up further including a center link having a pivotal connection at one end to the tractor, the link extending rearwardly from the tractor above the power take-off shaft, a pair of side links pivoted at one end on the tractor for swinging movement about a common axis parallel to that of the lift arms, a pair of connecting links pivotally connected between the lift arms and intermediate portions of the side links, of: a pair of plow beams formed identically to each other and having horizontal, straight leading end portions extending in a fore-and-aft direction and downwardly curving trailing end portions, said plow beams being spaced transversely of one another and being offset from one another in a direction longitudinally of the plow beams; plow bottoms carried by the plow beams at the trailing end portions thereof and spaced transversely and logitudinally of the plow beams correspondingly to the spacing of the plow beams; means adjacent the front end of the plow beams, connectable to said hook-up comprising upwardly convergent plates rigid at their divergent lower ends with the respective plow beams and spaced closely apart at their upper ends at a location offset laterally from a vertical plane lying medially between the respective plow beams, said plates at their upper ends being pivotally connected to the other end of the center link of said hook-up, said means further including a cross bar extending perpendicularly to the lengths of the plow beams and projecting at its opposite ends beyond the respective plow beams, through said plates, one end of said cross bar being pivotally connected to one of the side links of the hook-up in closely spaced relation to one of the plow beams, the other end of the cross bar projecting outwardly a substantial distance beyond the other plow beam and being pivotally connected to the other side link of the hook-up, the convergent ends of the plates being disposed symmetrically in respect to a vertical plane intersecting the cross bar medially between the points at which the cross bar is connected to the second and third portions of said hook-up; a pair of hanger bars extending downwardly from the front end portions of the respective plow beams and offset from one another longitudinally of the plow beams; substantially horizontal arms carried by said hanger bars and adjustable longitudinally of the hanger bars; a gear box mounted upon and between the plow beams, the gear box including an input shaft having a telescopic driving connection with the power take-off, said telescopic connection being universally connected at its opposite ends to the power take-off shaft and input shaft, and an output shaft projecting laterally from opposite sides of the gear box; cutter discs rotatably mounted upon the respective arms; and chain and sprocket driving connections between the projecting portions of the output shaft and the respective cutter discs, the chains of the last named driving connections being adjustably tensioned responsive to adjustment of the arms longitudinally of their associated hanger bars.

References Cited in the file of this patent

UNITED STATES PATENTS

| | | |
|---|---|---|
| 1,520,741 | Adamy | Dec. 30, 1924 |
| 1,539,066 | Adamy | May 26, 1925 |
| 1,795,182 | Ross | Mar. 31, 1931 |
| 2,576,500 | Cauble | Nov. 27, 1951 |
| 2,601,818 | Zwemke | July 1, 1952 |
| 2,731,897 | Frevik | Jan. 24, 1956 |